May 7, 1929.  S. S. WHIDDEN  1,711,864

HARNESS FOR CHILDREN

Filed Feb. 12, 1927

Inventor:
Samuel S. Whidden

Patented May 7, 1929.

1,711,864

UNITED STATES PATENT OFFICE.

SAMUEL S. WHIDDEN, OF PORTSMOUTH, NEW HAMPSHIRE.

HARNESS FOR CHILDREN.

Application filed February 12, 1927. Serial No. 167,858.

The invention relates to a harness for leading, guiding or restraining children.

It is customary for parents when walking with a small child to lead it by the arm, and in case the child stumbles or falls, to lift it by one of its arms. This is a harmful practise tending to cause serious injury to the arm or shoulder of the child.

One object of this invention is to discourage this harmful practise by providing a suitable body or shoulder harness, to which may be attached a leash or other holding medium for leading the child or for holding it in restraint. The invention further aims to provide a harness of simple and inexpensive construction so designed as to be comfortable for the wearer and to give the needed strength and security for the purpose to which it is put. The invention also aims to provide a harness so equipped that it may be adjusted quickly for size, to fit the wearer, and so arranged that it may be put on or taken off the wearer intact, without resort to any fastening devices.

The harness is cut, molded or fashioned of leather, rubber, fabric, or other flexible material suitable for the purpose; it is so equipped as to be adjustable for size and as to allow for the ready attaching of a leash.

One form of the invention is illustrated in the accompanying drawing.

Figure 1:
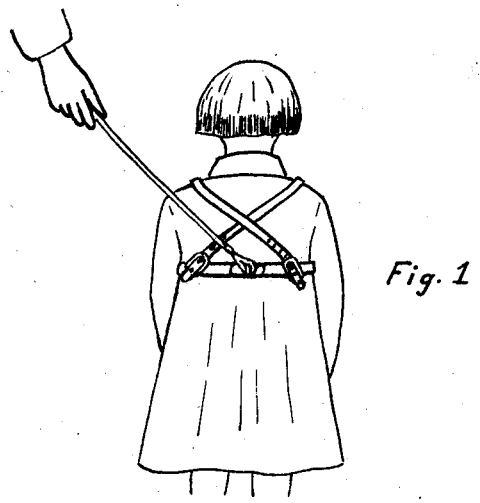

Fig. 1 is a perspective view of the harness in use, taken from the rear side. It shows a leash attached for leading the child. The leash forms no part of the present invention.

Figure 2:
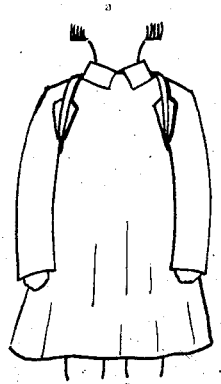

Fig. 2 is a perspective view of the harness in use, taken from the front side.

Figure 3:
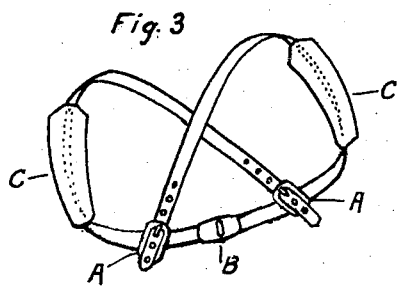

Fig. 3 is a perspective of the harness, drawn to a larger scale. A, A, are buckles or points of adjustment; B, is the fastening device for attaching leash.

The invention is not to be restricted to the details set forth, since these may be modified within the scope of the appended claim without departing from the spirit and scope of the invention.

What I claim as my invention and desire to secure by Letters Patent is:

A harness to be worn by children for use in leading, guiding, and restraining them: consisting of a single piece of flexible material applied across the back of the wearer, with ends passing under the arms, over the shoulders, and crossed on the back; with means for adjustably fastening these ends to that portion of said piece crossing the back.

SAMUEL S. WHIDDEN.